(12) United States Patent
Garric et al.

(10) Patent No.: US 9,915,205 B2
(45) Date of Patent: Mar. 13, 2018

(54) SUBSTITUTION DEVICE FOR AIRCRAFT ENGINE

(71) Applicant: AIRBUS OPERATIONS SAS, Toulouse (FR)

(72) Inventors: Stéphane Garric, Toulouse (FR); Philippe Vigneau, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 775 days.

(21) Appl. No.: 13/693,704

(22) Filed: Dec. 4, 2012

(65) Prior Publication Data

US 2013/0145770 A1    Jun. 13, 2013

(30) Foreign Application Priority Data

Dec. 8, 2011 (FR) .................................. 11 61302

(51) Int. Cl.
    *F02C 7/20*     (2006.01)
    *B64F 5/50*     (2017.01)
(52) U.S. Cl.
    CPC . *F02C 7/20* (2013.01); *B64F 5/50* (2017.01)
(58) Field of Classification Search
    CPC ........ B64F 5/00; B64F 5/0036; B64F 5/0081; F02C 7/20; F01D 25/285
    See application file for complete search history.

(56) References Cited

U.S. PATENT DOCUMENTS

| 2,685,964 | A | * | 8/1954 | Brown | ...................... F02C 7/00 206/319 |
| 4,037,809 | A | | 7/1977 | Legrand | |
| 4,825,648 | A | * | 5/1989 | Adamson | ............... B64D 29/00 60/226.1 |
| 5,372,338 | A | | 12/1994 | Carlin | |
| 6,170,141 | B1 | * | 1/2001 | Rossway | ............... B64F 5/0036 206/319 |
| 6,227,485 | B1 | * | 5/2001 | Porte | ...................... B64D 29/08 244/53 B |
| 7,959,106 | B2 | | 6/2011 | Guibert | |
| 2011/0265327 | A1 | | 11/2011 | West | |

FOREIGN PATENT DOCUMENTS

| CN | 101105150 | 10/2011 |
| EP | 1 878 662 | 1/2008 |

OTHER PUBLICATIONS

English Translation of Search Report which is an annex to Chinese Office Action dated Oct. 14, 2015.

* cited by examiner

*Primary Examiner* — Nicholas McFall
(74) *Attorney, Agent, or Firm* — Dickinson Wright PLLC

(57) ABSTRACT

A substitution device for replacing a turbojet type of aircraft engine, with a nacelle comprising protective covers, and a support mast having two engine mounts, each of said protective covers being mounted to pivot between an open position and a closed position, said substitution device comprising a body, two anchors attaching to the engine mounts of the engine support mast, and bearing portions adapted to receive support portions belonging to the protective covers.

A method for installing such a substitution device in a nacelle, which makes it possible to close the engine covers and authorize the movement of the aircraft.

1 Claim, 5 Drawing Sheets

SUBSTITUTION DEVICE FOR AIRCRAFT ENGINE

TECHNICAL FIELD

The present invention relates to substitution devices for an aircraft engine, in particular for turbojet engines.

These substitution devices can be considered as support tools to assist with aircraft construction and maintenance. Under normal circumstances, such aircraft engines are usually attached to a supporting mast and protected by a nacelle which includes cowls (protective covers) surrounding the engine.

PRIOR ART TECHNOLOGY

According to known prior art, one (or several) engines must sometimes be removed for maintenance on said engine or for engine replacement. However, in order to remove an engine, it is first necessary to open the engine covers which are part of the nacelle. It is known in the art that when said engine covers are in the open position, the aircraft must not be moved as this could cause damage to the engine covers or surrounding elements. Moreover, if the engine covers are placed in the closed position (which is the normal position when the engine is running) while the engine is absent, again the aircraft must not be moved as the engine covers could damage each other because they are not held in place by the engine.

It should be noted that in the present document, the engine covers (cowls) may be referred to either as "protective covers" or simply as "covers".

The objective of the present invention is to provide at least a partial solution for the problems of the prior art as mentioned above.

SUMMARY OF THE INVENTION

The present invention proposes a substitution device (i.e. a dummy engine), which is intended as a substitute for the turbojet type of aircraft engine within a propulsion system which further comprises a nacelle and has a main axis.

Said nacelle comprises at least one pair of protective covers for the engine, and the propulsion system comprises an engine support mast having at least two engine mounts; each of said protective covers is mounted to pivot about an axis which is substantially parallel to the main axis, between an open position and a closed position.

The substitution device comprises:
a body extending along a first axis, adapted to be positioned substantially parallel to the main axis,
anchors which are rigid with the body, adapted to be attached to the engine mounts of the engine support mast,
bearing portions on which the protective covers can rest.

Thanks to these arrangements, the protective covers can be closed on the substitution device and can be secured in this position so that the aircraft can be moved on its wheels with no risk of damage to the engine covers.

One or more of the following arrangements may be used in various embodiments of the invention, taken alone or in combination.

According to one aspect, the bearing portions can be arranged substantially in an arc; thereby the covers can rest on several points of the arc.

According to an aspect relating to the protective engine covers, said pair of protective covers forms a first pair of covers called reverser covers having a first series of support portions, and the nacelle can comprise a second pair of covers called "fan covers", having a second series of support portions; the bearing portions of the substitution device can comprise a first series of bearing portions adapted to receive said support portions of the first series of support portions, and a second series of bearing portions adapted to receive said support portions of the second series of support portions. In this manner, each of the reverser covers and fan covers can be closed and secured so that the aircraft can be moved.

According to another aspect of the invention, the bearing portions of the first series of bearing portions can be arranged substantially in an arc in a first transverse plane which is substantially perpendicular to the first axis, and the bearing portions of the second series of bearing portions can be arranged substantially in an arc in a second transverse plane which is substantially perpendicular to the first axis. Accordingly, the mechanical interface between the engine covers and the substitution device is thus very similar to the mechanical interface between the engine covers and the engine when it is in the service configuration.

According to another aspect, the bearing portions can be at least partially retractable.

According to another aspect, the bearing portions of the second series of bearing portions can be supported by a plurality of folding arms. In this manner, the footprint of the substitution device can be decreased, in particular when the substitution device is not installed in the propulsion assembly.

According to another aspect, the substitution device may further comprise a hydraulic unit and cylinders, adapted to connect the substitution device to each pair of covers. This allows maneuvering the engine covers with the assistance of a hydraulic system.

According to another aspect, the substitution device may also comprise wheels and a drawbar. The substitution device can thus be easily moved.

According to another aspect, the substitution device may further comprise lifting yokes. According to another aspect, the yokes can be foldable. In this manner the yokes can be folded so as not to interfere with the closing motion of the engine covers.

According to another aspect, the substitution device can be arranged in such a way that its center of gravity is located at or near the center of gravity of the engine which it replaces in the propulsion system. Thus when the substitution device is installed in the propulsion system, the weight balance of the wing and of the aircraft is similar to the normal configuration with an engine installed in the propulsion system.

According to another aspect, the substitution device can also comprise an inclinometer. The inclination of the substitution device can thus be monitored and controlled while it is being raised for installation in the propulsion system.

According to another aspect, the substitution device may further comprise a dynamometer arranged on a lifting yoke support. The lifting force can thus be monitored for the substitution device while it is being raised for installation in the propulsion system.

The invention also relates to a method for facilitating the movement of an aircraft designed to be driven by at least one turbo engine propulsion system, wherein at least one turbo engine has been removed from a propulsion system, and wherein said propulsion system comprises a nacelle having at least two engine covers pivotably mounted to allow access to the engine when they are open, said engine covers being in their opened position, said method comprising the following steps:

/a/ installing and attaching a substitution device in place of the turbo engine, the substitution device comprising at least two anchors adapted to be attached to engine mounts of an engine support mast, as well as bearing portions on which the engine covers can rest, /c/ closing each engine cover, /d/ authorizing the movement of the aircraft, Thanks to this method and to the substitution device, the engine covers can be closed on said substitution device and the aircraft can then be moved on its wheels with no risk of damage to said engine covers.

According to one aspect of the invention, step /a/ can make use of a temporarily installed winch device or a lifting platform in order to raise the substitution device to the position of substitution.

According to one aspect of the invention, the substitution device may comprise hydraulic cylinders and the method can thus further include the following step before step /c/, namely:

/b/ attaching the cylinders to the respective engine covers so that the operation can be assisted hydraulically.

According to another aspect of the invention, the nacelle can include a first pair of engine covers called reverser covers and a second pair of engine covers called fan covers, and step /c/ of the Method includes the substeps of:

/c1/—closing the reverser covers,

/c2/—closing the fan covers. Each of the reverser covers and fan covers can thus be closed and secured to authorize movement of the aircraft.

According to another aspect of the invention, the substitution device may comprise a hydraulic unit and a sequence unit, and the steps /c1/ and /c2/ can then be carried out under the control of said sequence unit. In this manner, potentially incorrect operations can be avoided.

BRIEF DESCRIPTION OF THE DRAWINGS

Other aspects, goals and advantages of the invention will become apparent upon reading the following description of an embodiment of the invention which is provided as a non-limiting example. The invention will be also better understood from the accompanying drawings, in which.

DETAILED DESCRIPTION OF THE INVENTION

When the same reference symbols are used in different figures, they designate the same or similar elements.

Throughout the entire description below, by convention, the terms "front" and "rear" are with respect to the direction of travel of an aircraft resulting from thrust exerted by its engines; this direction corresponds to the X pluses (X+).

Figure 1:
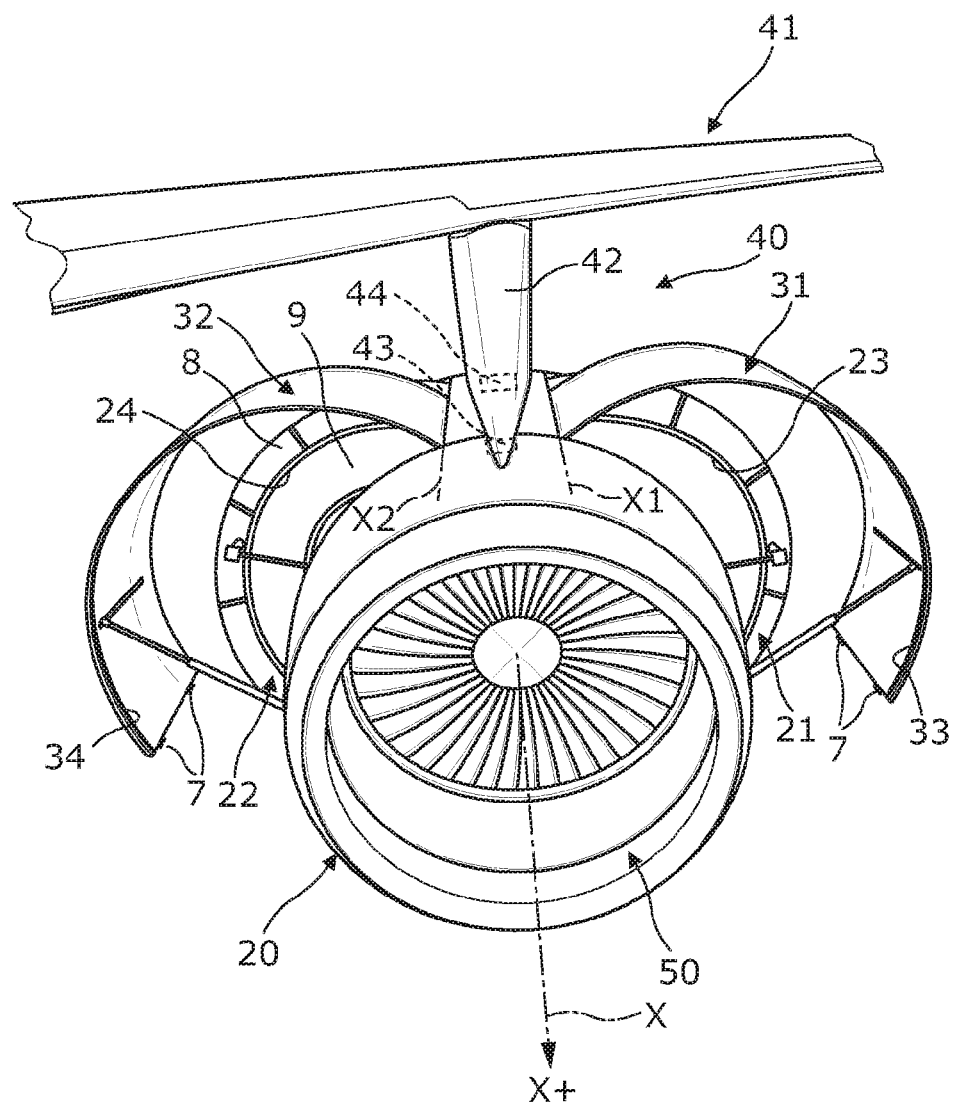
FIG. 1 schematically illustrates a propulsion system for an aircraft, with the engine present and the engine covers opened.

FIG. 1 schematically illustrates a propulsion system 40 for an aircraft. In the illustrated example, said propulsion system 40 comprises a turbo device of the turbojet type of engine, which will hereinafter be generically referred to as an "engine" 50.

The propulsion system 40 includes an engine support mast 42, which connects the engine 50 to the wing 41 of the aircraft. In the configuration shown in the example, the engine is arranged below the wing, and generally the engine is offset forward relative to the wing. In addition, the engine support mast 42 comprises at least two engine mounts 43, 44 used to affix the engine 50 to the engine support mast 42.

The propulsion system 40 also comprises a nacelle 20 which includes parts surrounding the engine 50. In particular, the nacelle includes aerodynamic fairings, and it can support or include auxiliary engine accessories.

The engine 50 and the nacelle 20 extend along the main axis X, which is generally coincident with the longitudinal axis of the aircraft.

The nacelle 20 comprises at least one pair of protective covers 21, 22 (also called engine covers), which extend circumferentially around the engine 50, in particular to protect the engine from the external environment and also to improve the aerodynamic performance of the propulsion system 40.

In the example illustrated here, the nacelle 20 includes two pairs of protective covers, namely a first pair of covers called reverser covers 21, 22, and a second pair of covers called fan covers 31, 32.

The first reverser cover 21 (here on the left) is mounted to pivot about a first cover axis X1, while the second reverser cover 22 (here on the right) is mounted to pivot about a second cover axis X2.

The cover axes X1, X2 preferably run parallel to the main axis X, but they could also deviate slightly from the parallel direction.

A first fan cover 31 (here on the left) is mounted to pivot about an axis parallel to or coincident with the first axis of the cover X1, while a second fan cover 32 (here on the right) is pivotally mounted about an axis parallel to or coincident with the second cover axis X2.

FIG. 1 shows the engine covers 21, 22, 31, 32 in the open position, which is a position that enables access to the internal parts and lateral parts of the engine for purposes including maintenance, inspection and the like.

In the normal usage position of the propulsion system 40, the covers 21, 22, 31, 32 are in a closed position, in which the covers are arranged substantially circumferentially around the engine; the nacelle 20 thus has an external cross-section which is more or less circular or is slightly ovoid.

In the illustrated example, each fan cover 31, 32 appears as a thin flange of a generally semi-cylindrical shape, preferably made of an aluminum alloy.

In the illustrated example, each reverser cover 21, 22 is of a thick construction that is generally semi-cylindrical in shape. The reverser cover comprises a radially hollow inner part 9 which allows the passage of part of a secondary air flow, and a radially outer part 8 which contains a reverse thrust mechanism for deflecting at least a portion of the secondary air flow toward the front of the aircraft.

Each of the covers 21, 22, 31, 32 respectively comprises support portions 23, 24, 33, 34, which will be explained in more detail below and which are supported, when the covers are in the closed position, on specific areas of the engine provided for this purpose (not shown in detail in FIG. 1).

Locking latches 7 make it possible to lock each of the covers in the closed position; in this manner, the closed position is secured for all normal operations in which the aircraft is used, including flight.

Figure 2:
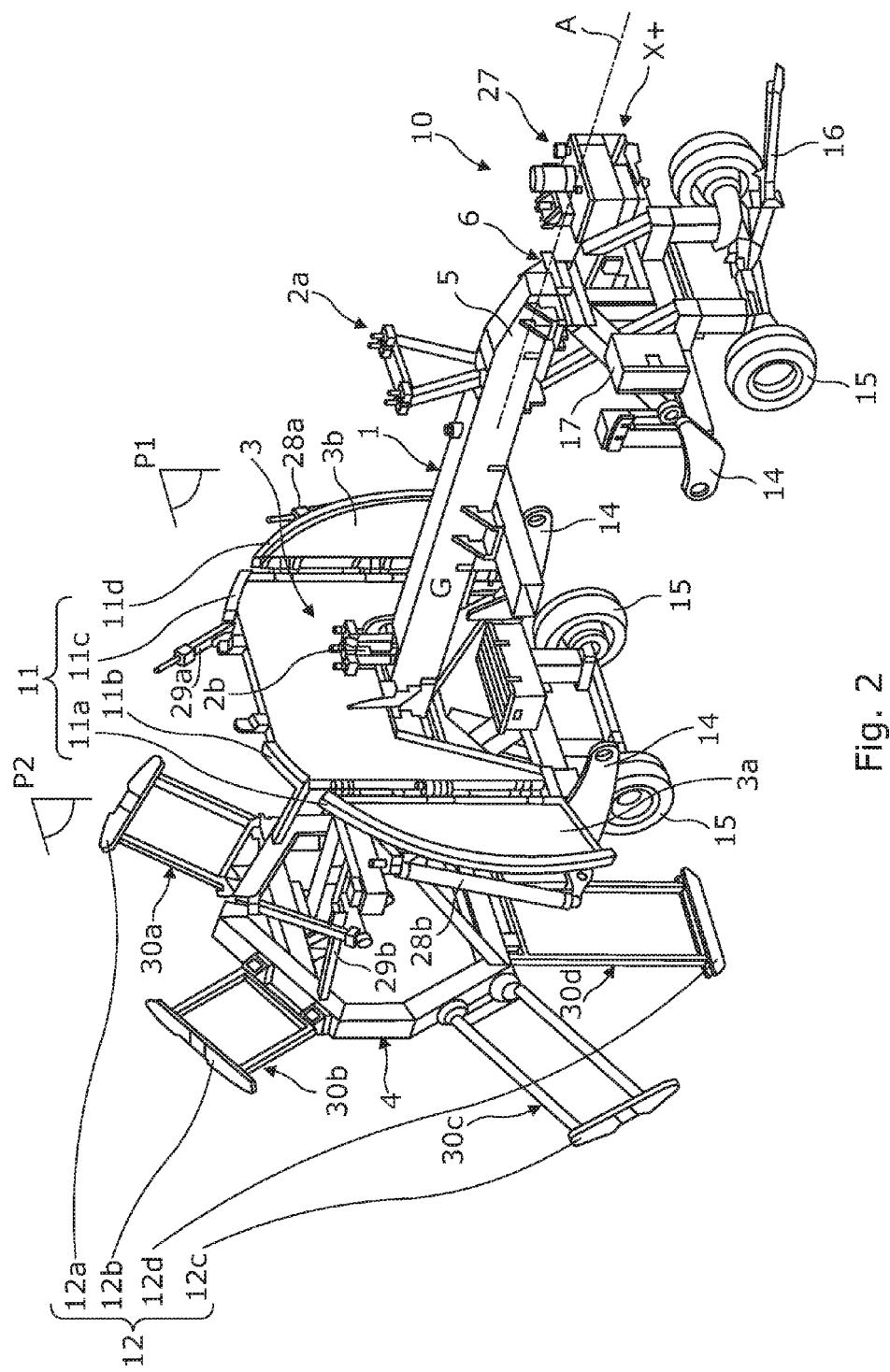
FIG. 2 is a perspective view of a substitution device according to an embodiment of the invention.

FIG. 2 shows a substitution device 10 intended to be substituted for an engine 50. This substitution device can be considered as a tool to assist with aircraft construction and maintenance. It can also be referred to as a "dummy engine".

The substitution device 10 comprises in particular a body 1 extending along a first axis A. This first axis A could be substantially aligned with the main axis X in order to install the substitution device 10 in the propulsion system 40. In the illustrated example, the body 1 has the form of a beam, but it could have any other form.

The substitution device 10 further comprises at least two anchors 2a, 2b, rigid with the body 1. These anchors 2a, 2b are to be attached to the abovementioned engine mounts 43, 44 of the engine support mast in order to attach the substitution device 10 in place of the engine.

The substitution device 10 further comprises bearing portions 11, 12 adapted to receive the abovementioned support portions 23, 24, 33, 34 which belong to the protective covers.

In this case, in the illustrated example, the abovementioned bearing portions 11, 12 of the substitution device 10 comprise:
- a first series of bearing portions 11a, 11b, 11c, 11d adapted to receive the support portions of the first series of support portions 23, 24 belonging to the reverser covers, this first series of bearing portions also being referred to as the "V-groove" in the industry,
- a second series of bearing portions 12a, 12b, 12c, 12d adapted to receive the support portions of the second series of support portions 33, 34 belonging to the fan covers.

Preferably, as illustrated in the figures, the portions in the first series 11 of bearing portions are substantially arranged in an arc in a first transverse plane P1 substantially perpendicular to the first axis A. Preferably, the first series of bearing portions is arranged in a peripheral area of a plate 3.

Similarly, as illustrated in the figures, the bearing portions of the second series 12 of bearing portions are arranged substantially in an arc in a second transverse plane P2 substantially perpendicular to the first axis A. Preferably, the second series of bearing portions is connected to a front frame 4. In this case, said front frame 4 is provided as mechanically welded tubes assembled in the general shape of a pentagon.

In addition, the illustrated substitution device 10 further comprises wheels 15, in this case four wheels 15 mounted respectively on a fixed axle and on a steering axle 6.

Advantageously, a drawbar 16 may optionally also be fixed to said steering axle 6 so that the substitution device can be easily moved and transported from one location to another location.

According to an optional feature, the center of gravity G of said substitution device can be located at or near the center of gravity of the engine 50 which it replaces in the propulsion system. In this manner, when the substitution device 10 is installed in the propulsion system, the weight balance of the wing and of the aircraft is similar to the normal configuration with the engine installed in the propulsion system 40.

Moreover, the weight of the substitution device 10 will be selected so that it is equivalent to the weight of the engine it is designed to replace. In this manner, if one engine is replaced by a substitution device, the left-right balance will not be substantially changed. For example, the substitution device may weigh between 2 and 5 tons, depending on the type of the engine it is intended to replace.

According to an optional feature, the substitution device 10 can further comprise lifting yokes 14. In the present case, it is proposed that four lifting yokes be used, each corresponding to one hoisting point as will be detailed below. It is advantageous when these yokes 14 can be folded, for example upwards, so as not to interfere with cover closure kinematics, in particular those of the reverser covers 31, 32.

Special arrangements can be provided in order to facilitate the handling and displacement of the substitution device 10.

In particular, in one advantageous and optional feature, the bearing portions of the second series 12 of bearing portions are supported by a plurality of folding arms 30a, 30b, 30c, 30d, 30e. The base of each arm is connected with a hinge on one segment of the mechanically soldered pentagonal structure 4 described above. Each arm can be pivoted to a right angle to the plane P2 in order to lie in a substantially longitudinal position.

Figure 3:
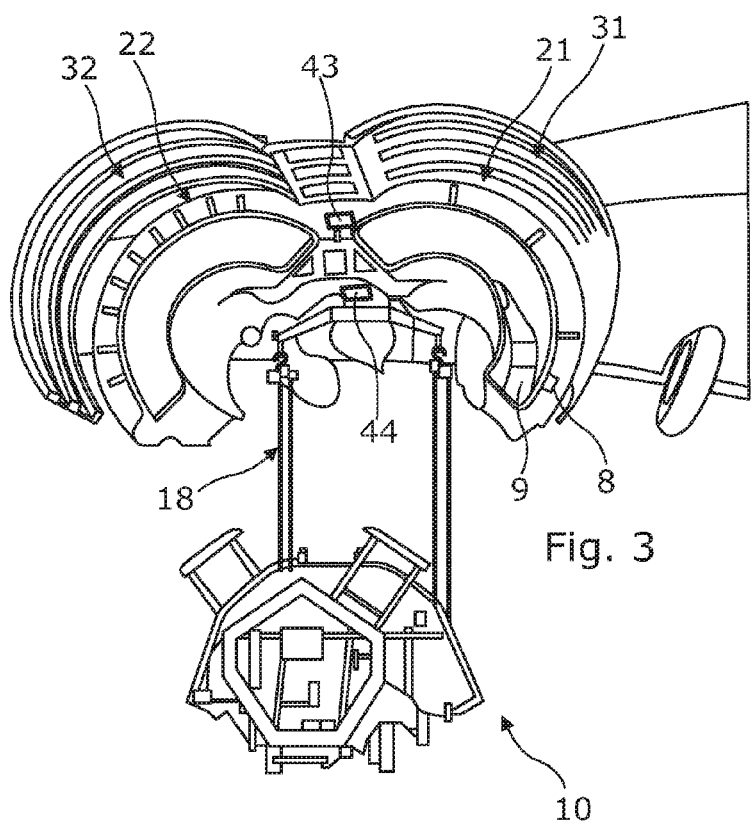
FIG. 3 shows a propulsion system for an aircraft without the engine, with the engine covers opened and a substitution device ready to be installed in place of the engine.
Figure 4:
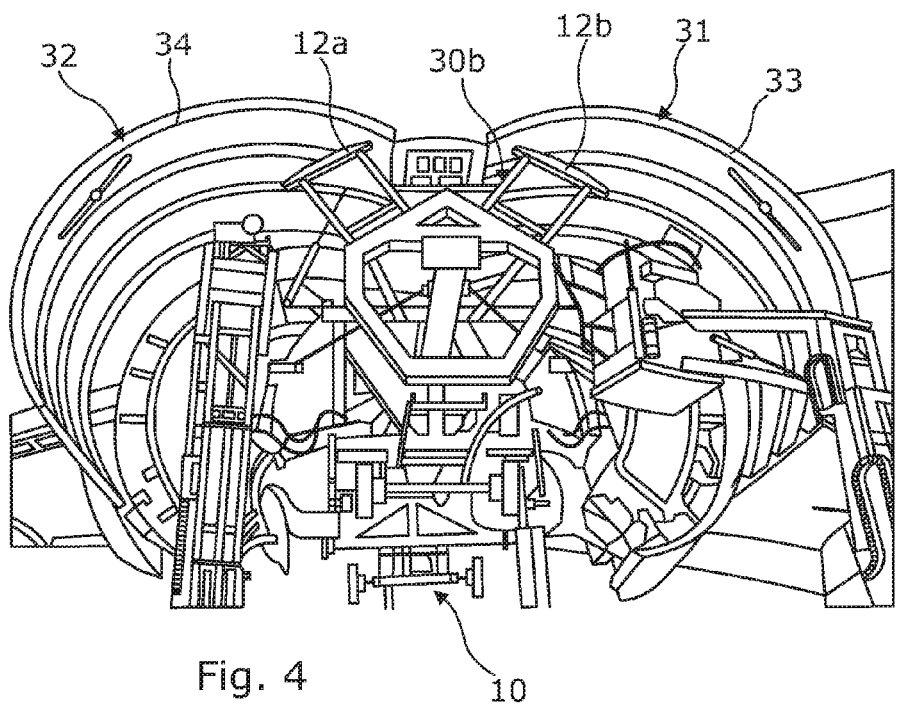
FIG. 4 is similar to FIG. 3 and it shows the same substitution device installed in place of the engine.
Figure 8:
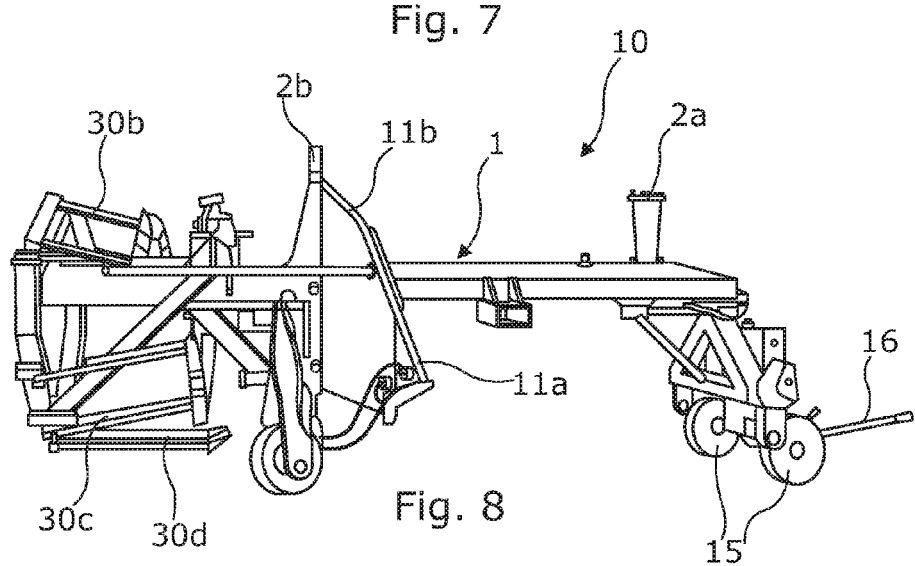
FIG. 8 shows a perspective view of the substitution device of FIG. 2, in the transport configuration.

In particular, as is illustrated in FIGS. 3, 4 and 8, the three downward-extending arms 30c, 30d 30e can be folded when rolling the substitution device 10 on the ground.

Moreover, the plate 3 may include two folding side portions 3a, 3b mounted to pivot on a substantially vertical axis.

FIG. 8 shows the substitution device 10 with the five folding arms 30a-30e in the folded position and with the two folding side portions 3a, 3b in the folded position. In this manner, the footprint of the substitution device 10 is minimal, and this substitution device 10 can be transported on a truck without exceeding the standard dimensions for road transport.

The substitution device 10 illustrated here further comprises a hydraulic unit 27 and cylinders 28a, 28b, 29a, 29b for connecting the substitution device to each pair of covers.

A first cylinder 28b enables to connect the substitution device 10 to the first reverser cover 21. A second cylinder 28a enables to connect the substitution device 10 to the second reverser cover 22. These two cylinders 28a, 28b are located in a plane that is close to plane P1.

A third cylinder 29b enables to connect the substitution device 10 to the first fan cover 31. A fourth cylinder 29a enables to connect the substitution device 10 to the second fan cover 32.

These connecting cylinders 28a, 28b, 29a, 29b are of a similar type and arrangement as the cylinders arranged on the engine 50 and partially visible in FIG. 1.

Figure 7:
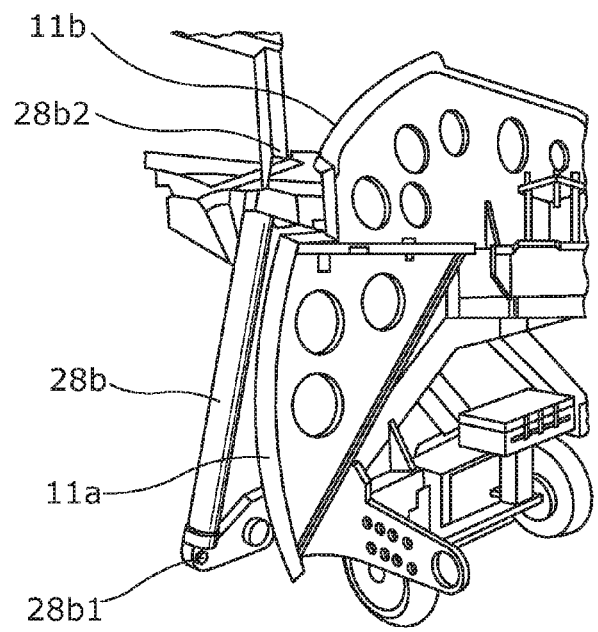
FIG. 7 shows details of an area containing the first bearing portions.

Each cylinder has a proximal end, for example end 28b1 in FIG. 7, attached to the substitution device 10, and a distal end, for example end 28b2 in FIG. 7, designed to be attached to the facing cover.

The hydraulic unit 27 supplies hydraulic pressure to these cylinders under the control of a control unit 17. This control unit can be a manual control unit with push buttons and a simple hardwired logic, but it may also include a sequence unit which makes it possible to verify the progress of the operations and compliance with one or more predefined sequences. Possible erroneous operations can thus be avoided.

FIGS. 3 and 4 illustrate the operation of installing the substitution device 10 in place of the engine 50. The substitution device 10 is first brought into vertical alignment with the engine support mast 42, for example by being pulled on wheels by a tractor vehicle.

A temporary "bootstrap" hoisting system 18 is installed which is equipped with four hoists. The chains of each hoist are then attached to the abovementioned lifting yokes 14 of the substitution device 10.

After the substitution device 10 is lifted, the anchors 2a, 2b are attached to the engine mounts 43, 44 with means similar to those used to attached the engine, as illustrated in FIG. 4.

Once the mounts 2a, 2b are locked in place, the temporary hoisting system 18 can be removed.

It should be noted that this temporary hoisting system 18 is also used to remove and replace the actual engine 50. However, an alternative to the described hoisting system is to use an elevating platform of sufficient dimensions and power to receive and lift the substitution device 10.

After fastening the substitution device 10 onto the mounts of the engine support mast, the distal end of each of the hydraulic cylinders 28a, 28b, 29a, 29b is attached to the corresponding cover that faces it.

The specific detachable connecting rods which hold the covers open when there is no engine or substitution device in the propulsion system 40 can then be removed; these connecting rods will be described in more detail below.

Figure 5:
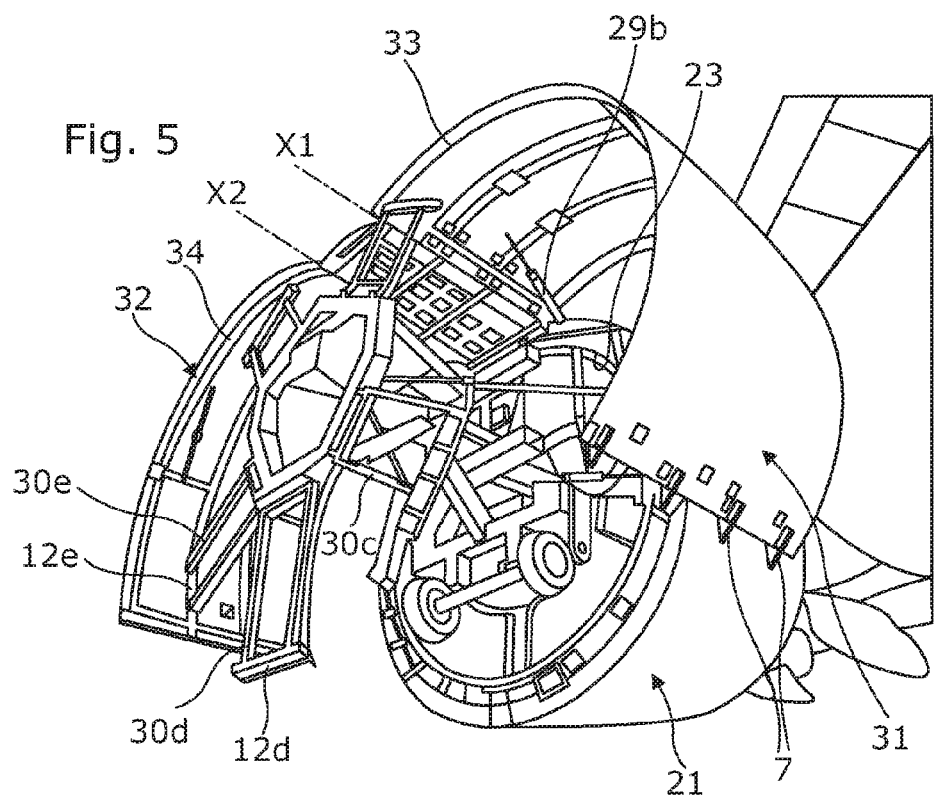
FIG. 5 shows the substitution device installed in place of the engine, with the reverser covers closed.

Next the reverser covers 21, 22 are moved to the closed position, as illustrated in FIG. 5. The cylinders 28a, 28b can be controlled simultaneously or in a non-simultaneous manner; similarly, this can be controlled manually or by an automatic sequence.

Figure 6:
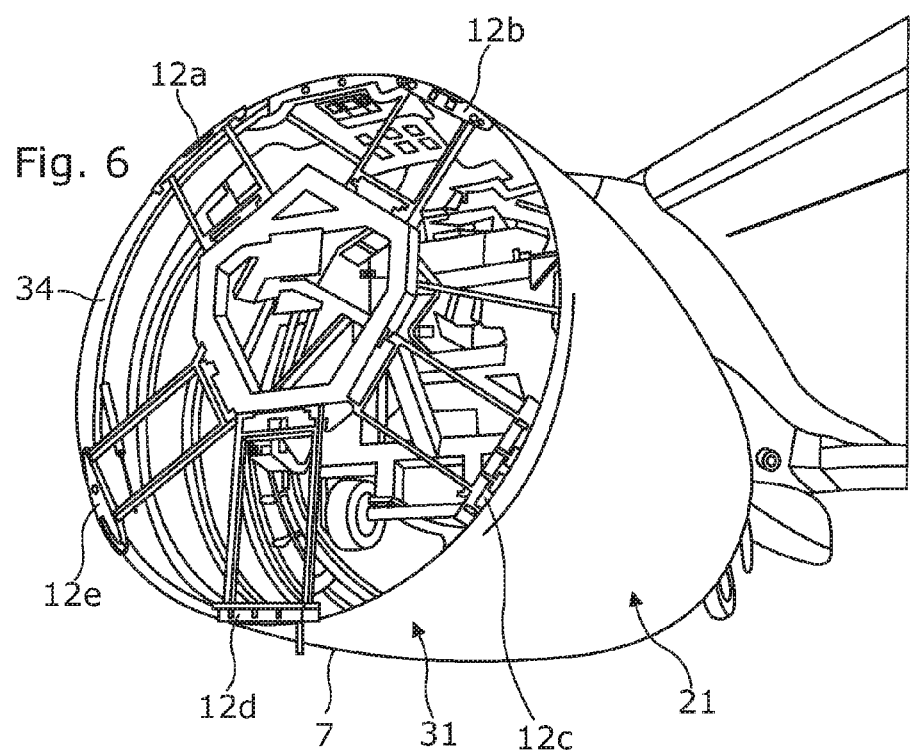
FIG. 6 is similar to FIG. 4, with the reverser covers and fan covers closed.

Then the fan covers 31, 32 are moved to the closed position, as illustrated in FIG. 6. The cylinders 29a, 29b can be controlled simultaneously or in a non-simultaneous manner; similarly, this can be controlled manually or by an automatic sequence.

After the four covers have been closed, the lower cover latches can be locked, by means of the latches 7 already mentioned and visible in FIG. 6.

At this point, movement of the aircraft can be authorized with no fear of damage to the reverser covers and fan covers.

One can therefore summarize the method concerning a propulsion system which is without its turbo engine and which has its engine covers opened, and a substitution device as defined above, intended to replace the absent engine, by the following steps:

/a/ installing the substitution device in place of the turbo engine,
/b/ (optional step) attaching the cylinders to the respective engine covers,
/c/ closing the at least two engine covers,
/d/ authorizing the movement of the aircraft.

It is preferred when the step in which the covers are closed is executed in two substeps:

/c1/ closing the reverser covers 21, 22,
/c2/ closing the fan covers 31, 32.

It goes without saying that in order to remove the substitution device 10 to replace it with an engine, the method is performed in the reverse order, namely the fan covers are opened first and then the reverser covers are opened.

Figure 9:
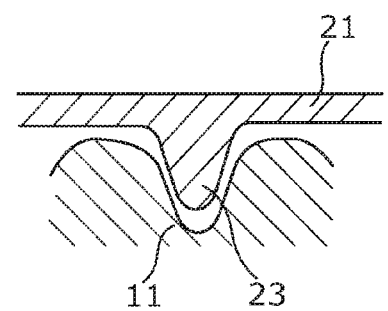
FIG. 9 shows details of the interface between a support portion and a bearing portion.

FIG. 9 shows the principle of the interface between a support portion 23 and a bearing portion 11a. The support portion is in the form of a finger which is inserted into a groove-shaped portion. When the finger 23 is in the groove, all longitudinal movement of the cover is prevented. The latches 7 which lock the covers in place make it possible to firmly maintain this position.

Obviously, any other mechanical coupling system can be also used.

According to an optional feature, the substitution device 10 can further comprise an inclinometer. The inclination of the substitution device can thus be monitored and controlled while it is being raised for installation in the propulsion system.

According to an optional feature, the substitution device 10 can further comprise a dynamometer arranged on a lifting yoke support. In this manner, the lifting force can be monitored for the substitution device while it is being lifted for installation in the propulsion system. It should be noted that according to an optional characteristic, the provisional "bootstrap" hoisting system may also include a dynamometer.

It should be noted that when neither the engine nor the substitution device 10 are present in their position in the propulsion system, the covers are held open by specific removable rods designed for this purpose. A first pair of rods connects the reverser covers 21, 22 to the engine support mast 22.

A second pair of rods connects the fan covers to the engine support mast 42 or to the reverser covers 21, 22 already in the opened position. Said rods are arranged so as not to interfere with the installation of the engine or substitution device 10 into the propulsion system 40.

The present invention is not limited to the embodiments described above, which are provided as non-limiting examples. It also relates to all variant embodiments within the scope of the claims below and within the reach of a person skilled in the art.

The invention claimed is:

1. A substitution device, intended as a substitute for an aircraft engine within a propulsion system which further comprises a nacelle and has a main axis, said nacelle comprising at least one pair of protective covers for the engine, and the propulsion system comprising an engine support mast having at least two engine mounts, each of said protective covers being mounted to pivot about an axis which is substantially parallel to the main axis, between an open position and a closed position, said substitution device comprising:

a body extending along a first axis, structured to be positioned substantially parallel to the main axis of the propulsion system,
at least two anchors, which are mounted rigid with the body and structured to be attached to the engine mounts of the engine support mast,
bearing portions structured to provide a surface on which the protective covers rest, and
an inclinometer that monitors and controls the inclination of the substitution device.

* * * * *